United States Patent
Wolford

(12)
(10) Patent No.: US 6,185,692 B1
(45) Date of Patent: Feb. 6, 2001

(54) DATA PROCESSING SYSTEM AND METHOD FOR DYNAMICALLY SETTING BUS CLOCK FREQUENCY IN RESPONSE TO A NUMBER OF LOADS

(75) Inventor: Robert Russell Wolford, Durham, NC (US)

(73) Assignee: International Business Machine Corporation, Armonk, NY (US)

( * ) Notice: Under 35 U.S.C. 154(b), the term of this patent shall be extended for 0 days.

(21) Appl. No.: 09/078,351

(22) Filed: May 12, 1998

(51) Int. Cl.[7] .................................................. G06F 13/00
(52) U.S. Cl. ................................. 713/501; 710/31
(58) Field of Search ............................. 713/500, 501, 713/502, 503, 600; 710/104, 126, 127, 100

(56) References Cited

U.S. PATENT DOCUMENTS 5,491,814 * 2/1996 Yee ........................................ 395/550
5,761,461 * 6/1998 Neal ...................................... 395/309
5,778,194 * 7/1998 McCombs ............................. 395/280
5,809,291 * 9/1998 Munoz-Bustamante .............. 395/556
5,815,734 * 9/1998 Lee ....................................... 395/880

* cited by examiner

Primary Examiner—Thomas C. Lee
Assistant Examiner—Nitin Patel
(74) Attorney, Agent, or Firm—George E. Grosser; Andrew Dillon

(57) ABSTRACT

A data processing system includes a bus, one or more loads coupled to the bus, and a clock generator. The clock generator generates a bus clock signal that is coupled to at least one of the loads. While the clock generator is generating a bus clock signal having a first frequency, the number of loads connected to the bus is determined. In response to this determination, the frequency of the bus clock signal is automatically changed from the first frequency to a second frequency. In one embodiment in which the bus is a PCI local bus having a plurality of slots, the determination of the number of loads is made by examining at least one storage location associated with each of a plurality of slots.

8 Claims, 2 Drawing Sheets

DATA PROCESSING SYSTEM AND METHOD FOR DYNAMICALLY SETTING BUS CLOCK FREQUENCY IN RESPONSE TO A NUMBER OF LOADS

BACKGROUND OF THE INVENTION

1. Technical Field

The present invention relates in general to a method and system for data processing and in particular to a method and system for selecting a bus clock frequency of a data processing system. Still more particularly, the present invention relates to a method and system for dynamically setting the bus clock frequency of a data processing system in response to a number of loads.

2. Description of the Related Art

As microprocessor technology has continued to advance, the user's perception of the performance of a personal computer system is less determined by the clock frequency at which the central processing unit (CPU) operates and more determined by the data communication capabilities of the personal computer system. In a typical personal computer system, which may contain a CPU, one or more levels of memory, and a number of adaptor cards all coupled by one or more buses, the data communication capabilities of the personal computer system are determined in large measure by the throughput of the selected bus architecture. The throughput of the selected bus architecture is determined, in turn, by a number of factors, including the bandwidth of the bus, the bus clock frequency, and the overhead of the bus communication protocol.

Naturally, in order to enhance the performance of a computer system, it is desirable to increase the throughput of the selected bus architecture by increasing the bus clock frequency and/or bandwidth while decreasing the bus communication protocol overhead. One primary limitation on bus clock frequency is the number of loads connected to the bus. For example, the bus clock for a PCI (Peripheral Component Interconnect) local bus is permitted by the PCI specification to operate at any frequency between 0 and 66 Megahertz (MHz), but can only operate at maximum frequency if the PCI local bus has three or less loads. Otherwise, the PCI local bus is constrained to operate at a lower frequency. As a result, the current industry standard operating frequency for PCI local buses is 33 MHz, at which speed a PCI local bus can support up to ten loads.

SUMMARY OF THE INVENTION

It is therefore one object of the present invention to provide an improved method and system for data processing.

It is another object of the present invention to provide an improved method and system for selecting a bus clock frequency of a data processing system.

It is yet another object of the present invention to provide a method and system for dynamically setting the bus clock frequency of a data processing system in response to a number of loads.

The foregoing objects are achieved as is now described. A data processing system is provided that includes a bus, one or more loads coupled to the bus, and a clock generator. The clock generator generates a bus clock signal that is coupled to at least one of the loads. While the clock generator is generating a bus clock signal having a first frequency, the number of loads connected to the bus is determined. In response to this determination, the frequency of the bus clock signal is automatically changed from the first frequency to a second frequency. In one embodiment in which the bus is a PCI local bus having a plurality of slots, the determination of the number of loads is made by examining at least one storage location associated with each of a plurality of slots.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
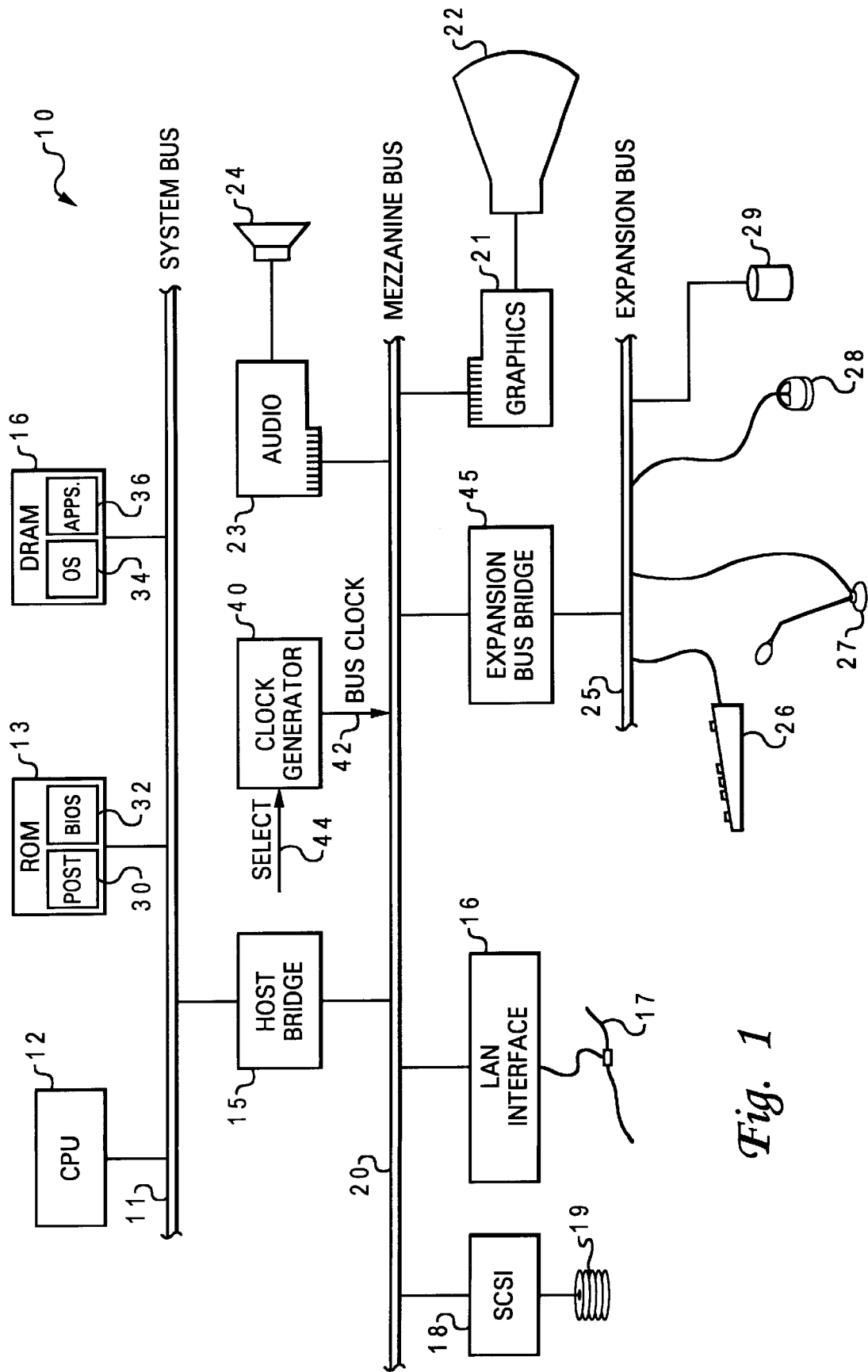
FIG. 1 a block diagram of an illustrative embodiment of a data processing system with which the present invention may advantageously be utilized.

With reference now to the figures and in particular with reference to FIG. 1, there is depicted an illustrative embodiment of a data processing system with which the present invention may advantageously be utilized. As illustrated, data processing system 10, which may comprise a personal computer system, includes a central processing unit (CPU) 12, a read only memory (ROM) 13, and a dynamic random access memory (DRAM) 14, which are each connected to system bus 11. ROM 13 stores boot code, including Power-On Self Test (POST) 30 and Basic Input/Output System (BIOS) 32, which are executed by CPU 12 at power on. Following power on, CPU 12 typically executes operating system (OS) and application software (shown at reference numerals 34 and 36, respectively) stored within DRAM 14.

System bus 11 is coupled, via host bridge 15, to mezzanine bus 20, which can be implemented as a local bus or a pseudo-local bus such as a Peripheral Component Interconnect (PCI) bus. Host bridge 15 provides a low latency path through which CPU 12 can directly access mezzanine bus devices mapped within the bus memory, I/O, or configuration address spaces. In addition, host bridge 15 provides a high bandwidth path through which mezzanine bus devices can directly access DRAM 14. The mezzanine bus devices attached to mezzanine bus 20 include a small computer system interface (SCSI) 18 that controls SCSI disk drive 19, a local area network (LAN) interface 16 that controls access to LAN 17, an audio adapter 23 that drives speaker(s) 24, and a graphics adapter 21 that controls display 22. As illustrated, communication between the mezzanine bus devices coupled to mezzanine bus 20 is synchronized by a bus clock signal 42 generated by clock generator 40.

Mezzanine bus 20 is further coupled to an expansion bus 25 (e.g., an Industry Standard Architecture (ISA), Enhanced ISA (EISA), or Microchannel Architecture (MCA) bus) via expansion bus bridge 45. As shown, expansion bus 25 supports communication with a number of conventional peripheral devices, including keyboard 26, microphone 27, mouse 28, integrated device electronics (IDE) hard disk 29, and printer 30. As will be understood by those skilled in the art, SCSI disk drive 19 and IDE hard disk 29 provide non-volatile storage for instructions and data that may be accessed and processed by CPU 12.

Still referring to FIG. 1, the permissible frequency range of bus clock signal 42 is determined by a number of factors, including the length of mezzanine bus 20 and the number and type of devices attached to mezzanine bus 20. For example, in an embodiment in which mezzanine bus 20 is a PCI bus, bus clock signal 42 is permitted to have any frequency between 0 and 66 Mhz, but can only oscillate at the maximum frequency if three or less loads are attached to the PCI bus. Thus, a maximum of two add-in boards may be plugged into PCI expansion slots for 66 MHz operation. In configurations in which additional loads are attached to the PCI bus, the maximum permissible bus clock frequency decreases accordingly. The relationship between the PCI bus clock frequency and the number of PCI loads is summarized below in Table I.

TABLE I

| PCI Loads | PCI Bus Clock Frequency |
| --- | --- |
| 1–3 | 66 MHz |
| 4–5 | 50 MHz |
| 6–10 | 33 MHz |
| 11–15 | 25 MHz |

To extract maximum performance from data processing system 10, it is desirable to set the frequency of bus clock signal 42 to the highest possible frequency for the number and type of attached loads. In contrast to conventional computer systems that require buses to be quiesced and attached devices to be reset in order to alter the bus clock frequency (e.g., in response to the removal or insertion of an add-in board), the present invention permits the frequency of bus clock signal 42 to be dynamically adjusted during normal operation of mezzanine bus 20. In accordance with the present invention, clock generator 40 is capable of dynamically varying the frequency of bus clock signal 42 in response to select signals 44. Any frequency change indicated by select signals 44 preferably is not implemented suddenly. Instead, clock generator 40 preferably gradually and monotonically increases or decreases the frequency of bus clock signal 42 to the indicated frequency, thereby permitting phase-locked loop circuits within mezzanine bus devices to follow the frequency shift. In this manner, mezzanine bus devices are not required to be reset (e.g., by rebooting data processing system 10) to respond to dynamic changes in the frequency of bus clock signal 42.

Figure 2:
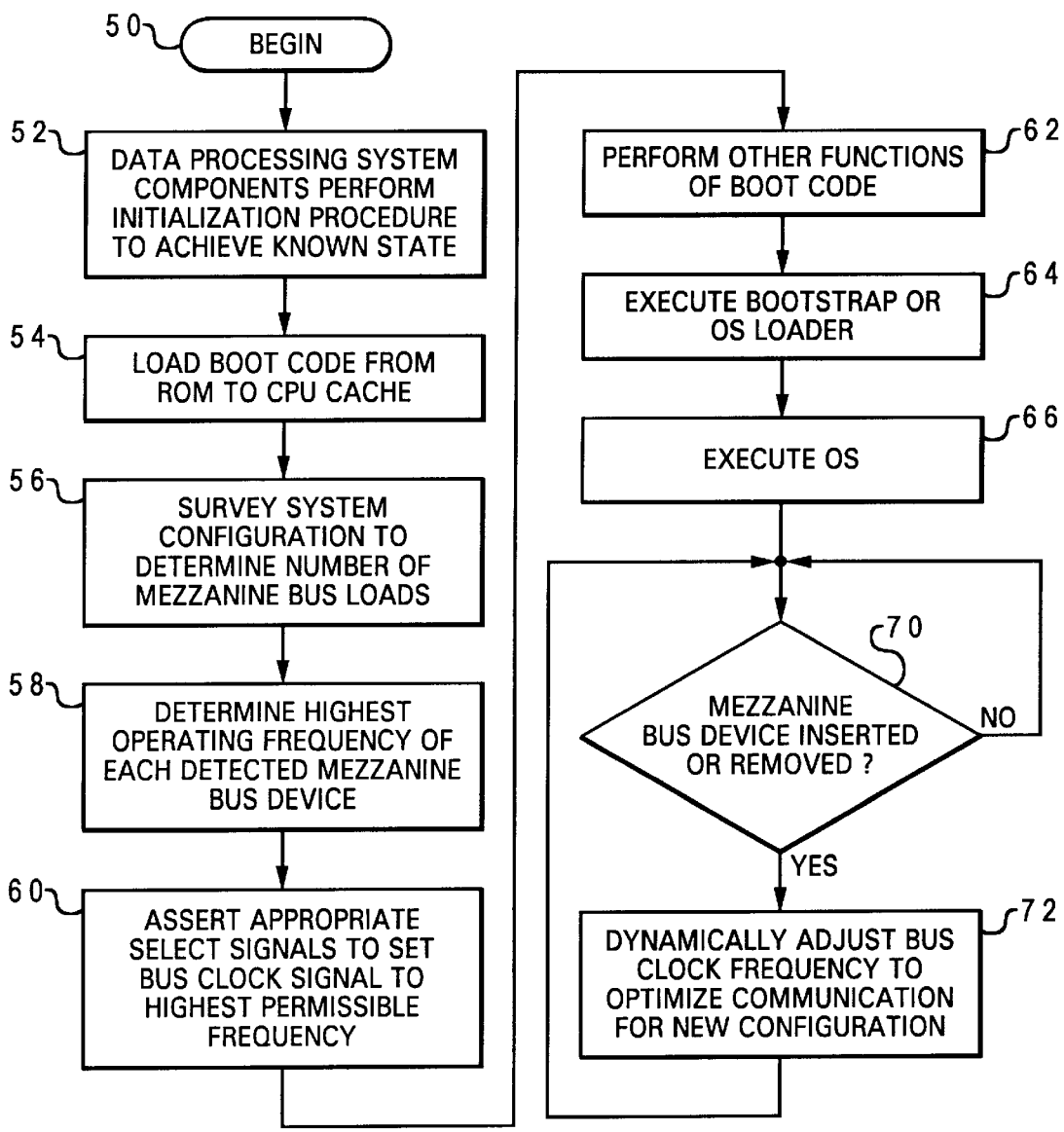
FIG. 2 is a high level logical flowchart of a method for dynamically setting the frequency of the bus clock signal utilized to synchronize communication on the mezzanine bus depicted in FIG. 1.

Referring now to FIG. 2, there is depicted a high level logical flowchart of a method for dynamically adjusting the frequency of bus clock signal 42 in accordance with the present invention. The illustrated process is preferably performed upon power on and is therefore conveniently implemented as a portion of the boot code stored in ROM 13 (e.g., POST 30). However, it should be understood that the method of the present invention is not limited to such embodiments, but instead can be implemented as a configuration utility provided by OS 34, as described further below.

As illustrated, the process begins at block 50 in response to a user powering on data processing system 10. The process then proceeds to block 52 system 10 performing an internal initialization procedure to achieve a stable, known state. Once clock generator 40 has completed its initialization procedure at block 52, clock generator 40 begins to output a bus clock signal 42 having a predetermined initial frequency, for example, 33 MHz. As depicted at block 54, CPU 12 then loads boot code, including POST 30 and BIOS 32, from ROM 13 into its internal cache and begins execution. The process then proceeds from block 54 to block 56.

Block 56 illustrates the boot code executed by CPU 12 surveying the configuration of data processing system 10 to determine what devices are installed in data processing system 10. The configuration survey conducted at block 56 includes a determination of the number of loads attached to mezzanine bus 20 and therefore the highest frequency of bus clock signal 42 allowed for the current configuration. For example, for an embodiment in which mezzanine bus 20 is a PCI bus, the boot code interrogates, via system bus 11 and host bridge 15, the first four bytes of the 256-byte configuration space allocated to each PCI device slot. According to the PCI specification, the first four bytes of the configuration space of each PCI device must specify the device ID and vendor ID for identification purposes. If no PCI device is installed, host bridge 15 returns a value of all 1's (FFFFFFFFh); any other value for the device ID and vendor ID will be interpreted as a occupied slot.

The process then proceeds from block 56 to block 58, which illustrates a determination of the highest operating frequency of each mezzanine bus device detected at block 56. In an embodiment in which mezzanine bus 20 is a PCI bus, the highest operating frequency of each installed device is determined by reading the PCI status field comprised of the fifth and sixth bytes of the device's associated configuration space. Mezzanine bus 20 is preferably constrained to operate at a frequency no greater than the lowest maximum operating frequency of any mezzanine bus device directly connected to mezzanine bus 20 (i.e., as opposed to devices coupled through a bridge). Based upon the number of mezzanine bus devices detected at block 56 and the lowest maximum operating frequency determined at block 58, at block 60 the boot code executed by CPU 12 generates appropriate select signals 44 to set the frequency of bus clock signal 42 to the maximum frequency that is permitted for the number of attached loads and that is supported by all attached mezzanine bus devices. As discussed supra, if indicated by select signals 44, clock generator 40 preferably changes the frequency of bus clock signal 42 gradually and monotonically from the predetermined initial frequency to the maximum permitted frequency indicated by select signals 44.

Next, as depicted at block 62, the remainder of the functions specified by the boot code are performed. As shown at block 64, these functions can include the execution of a bootstrap or OS loader. Thereafter, the OS begins execution at block 66, at which time additional applications 36 can be invoked. Thereafter, a determination is made at block 70 whether or not an add-in card has been inserted into or removed from a expansion slot connected to mezzanine bus 20. The decision illustrated at block 70 can be made, for example, by OS 34 again surveying the configuration of mezzanine bus 20 as discussed above with respect to block 56 or in response to user invocation of an OS configuration utility that initiates a survey of the configuration of mezzanine bus 20. If the configuration of mezzanine bus 20 has not changed, the process simply iterates at block 70. However, in response to a determination that the configuration of mezzanine bus 20 has changed, the process passes to block 72, which depicts the OS configuration utility dynamically adjusting the frequency of bus clock signal 42 as discussed above with respect to blocks 58 and 60. Thereafter, the process returns to block 70, which has been described.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the method of the present invention, it should be understood that present invention may alternatively be implemented as a computer program product for use with a computer system. Programs defining the functions of the present invention can be delivered to a computer system via a variety of computer usable media, which include without limitation non-writable storage media (e.g., CD-ROM), writable storage media (e.g., a floppy diskette or hard disk drive), and communication media, such as analog and digital communication networks. It should be understood, therefore, that such computer usable media, when carrying or encoding computer readable instructions that direct the method functions of the present invention, represent alternative embodiments of the present invention.

What is claimed is:

1. A method, within a data processing system including a bus having plurality of slots at which loads can be coupled to the bus, for setting the frequency of a bus clock signal, said method comprising:

generating a bus clock signal having a first frequency;

determining a number of loads connected to the bus at power on of the data processing system by examining at least one storage location associated with each of said plurality of slots; and in response to said determination, gradually and monotonically changing a frequency of the bus clock signal from said first frequency to a second frequency.

2. The method of claim 1, wherein said first frequency is higher than said second frequency.

3. The method of claim 1, wherein said second frequency is higher than said first frequency.

4. A program product for use by a computer to setting the frequency of a bus clock signal, the computer having a bus including a plurality of slots, wherein each said slot can be coupled to a load, said program product comprising:

a bus clock frequency determining program code for, while a bus clock signal has a first frequency, causing the computer to determine a number of loads connected to the bus at power on by examining at least one storage location associated with each of said plurality of slots;

a bus clock frequency changing program code for, gradually and monotonically, changing the frequency of the bus clock signal from said first frequency to a second frequency in response to the determination; and a computer usable medium in which said bus clock frequency determining program code and said bus clock frequency changing program code is encoded.

5. A data processing system, comprising:

a bus having a plurality of slots;

one or more loads coupled to different ones of the plurality of bus slots;

a clock generator that generates a bus clock signal having a frequency, said bus clock signal being coupled to at least one of said one or more loads; and means for determining a number of loads connected to the bus at power on of the data processing system by examining at least one storage location associated with each of said plurality of slots while said bus clock signal has a first frequency and for gradually and monotonically changing the frequency of the bus clock signal from said first frequency to a second frequency in response to said determination.

6. The data processing system of claim 5, wherein said first frequency is higher than said second frequency.

7. The data processing system of claim 5, wherein said second frequency is higher than said first frequency.

8. The data processing system of claim 5, wherein said bus is a Peripheral Component Interconnect (PCI) local bus.

* * * * *